US012768667B2

(12) United States Patent
Mesery et al.

(10) Patent No.: US 12,768,667 B2
(45) Date of Patent: Oct. 20, 2026

(54) PARKING SLOT ANNOTATION

(71) Applicant: IMAGRY ISRAEL LTD., Haifa (IL)

(72) Inventors: Itai Mesery, Yokneam Ilit (IL); Khaled Fahoum, Acre (IL); Nikolai Nikola, Haifa (IL); Ilan Shaviv, Shimshit (IL)

(73) Assignee: IMAGRY ISRAEL LTD., Haifa (IL)

( * ) Notice: Subject to any disclaimer, the term of this patent is extended or adjusted under 35 U.S.C. 154(b) by 166 days.

(21) Appl. No.: 18/632,635

(22) Filed: Apr. 11, 2024

(65) Prior Publication Data

US 2025/0321117 A1 Oct. 16, 2025

(51) Int. Cl.
*G01C 21/36* (2006.01)
*G08G 1/14* (2006.01)

(52) U.S. Cl.
CPC ........... *G01C 21/3685* (2013.01); *G08G 1/14* (2013.01)

(58) Field of Classification Search
None
See application file for complete search history.

(56) References Cited

U.S. PATENT DOCUMENTS

2017/0206473 A1* 7/2017 Dermosessian ........ G08G 1/144
2021/0064892 A1* 3/2021 Adelsberger ......... G06V 20/588
2023/0146185 A1* 5/2023 Ho ......................... G06V 10/26 382/103

FOREIGN PATENT DOCUMENTS

EP 3764335 A1 1/2021

OTHER PUBLICATIONS

ParkCAD, "Fit for Purpose", 2011, Intertraffic World, Annual Showcase 2011, p. 190-191 (Year: 2011).*
ISR & WO for PCT/IL2025/050287 (Jul. 3, 2025).

* cited by examiner

*Primary Examiner* — Hongye Liang

(57) ABSTRACT

A method, a computer program product and an apparatus for annotating parking slots in a map representing an overhead view of a at least partially drivable area. The method comprises presenting the map to a user, defining a parking sequence object in the map by obtaining a user selection in the map of a start point and of an end point and determining an orientation angle. The method further comprises determining, based on the parking sequence object, a plurality of parking slot objects equidistant along a line defined between the start point and the end point, and positioned in an identical angle with respect to the line being defined based on the orientation angle. The identified parking slot objects are presented on the map and utilized in training parking slot detection models for identifying parking slots in maps.

19 Claims, 4 Drawing Sheets

PARKING SLOT ANNOTATION

TECHNICAL FIELD

The present disclosure relates to parking slot detection in general, and to parking slot annotation, in particular.

BACKGROUND

With the ever-increasing pace of urbanization, the demand for efficient parking solutions is becoming paramount to mitigate the challenges arising from limited parking availability in urban environments. Conventional parking experiences often entail frustrating and time-consuming quests for available parking spaces, exacerbating congestion and environmental concerns. Current parking systems, predominantly relying on manual methods or rudimentary sensor technologies, frequently provide inaccurate information regarding parking space availability. This inefficiency underscores the pressing need for enhancement through the integration of advanced computer vision techniques for parking slot detection.

Computer vision, an interdisciplinary domain, is dedicated to enabling machines to interpret and comprehend visual data. It encompasses the development of algorithms and methodologies aimed at analyzing, processing, and extracting meaningful insights from images or video streams. In the context of parking slot detection, computer vision algorithms offer the capability to differentiate between vacant and occupied parking spaces, facilitate real-time monitoring of parking occupancy, and deliver timely updates to users, thereby significantly improving overall parking management efficiency.

BRIEF SUMMARY

One exemplary embodiment of the disclosed subject matter is a method for annotating parking slots in a map, the method comprising: presenting the map to a user, the map representing an overhead view of a at least partially drivable area; defining a parking sequence object in the map, wherein said defining comprises: obtaining a user selection in the map of a start point and of an end point; and determining an orientation angle; determining, based on the parking sequence object, a plurality of parking slot objects, the plurality of parking slot objects are equidistant along a line defined between the start point and the end point, the plurality of parking slot objects are positioned in an identical angle with respect to the line, wherein the identical angle is defined based on the orientation angle; presenting over the map the plurality of parking slot objects; and utilizing the plurality of parking slot objects in training a parking slot detection model, the parking slot detection model is a digital product that is configured to identify parking slots in maps.

Optionally, the map is a perception map, the perception map comprises at least a parking area segmentation layer and a driving area segmentation layer, wherein the perception map is presented with a different visual indication to different layers.

Optionally, the start point and the end point are located in locations defined in the parking area segmentation layer as parking areas.

Optionally, said obtaining user selection comprises verifying that each point in the line defined by the start point and the end point is located in a location defined in the parking area segmentation layer as parking areas, whereby verifying that the plurality of parking slot objects are located in a continuous parkable area.

Optionally, said defining the parking sequence object comprises defining an occupancy class of the parking sequence object, the occupancy class of the parking sequence object is selected from a group including at least a vacant parking class and an occupied parking class, wherein said determining the plurality of parking slot objects comprises assigning to each parking slot object of the plurality of parking slot objects the occupancy class of the parking sequence object.

Optionally, said determining the plurality of parking slot objects comprises: determining for each parking slot object of the plurality of parking slot objects an occupancy class, the occupancy class of the parking sequence object is selected from a group including at least a vacant parking class and an occupied parking class.

Optionally, said determining for each parking slot object the occupancy class comprises: determining a default occupancy class for all parking slot objects; and enabling the user to modify the default occupancy class of a parking slot object.

Optionally, said determining for each parking slot object the occupancy class comprises: automatically determining, based on the map, an occupancy class for each parking slot object of the plurality of parking slot objects; and enabling the user to modify the automatically determined occupancy class of a parking slot object.

Optionally, said determining the plurality of parking slot objects comprises determining, based on the orientation angle, a length of the line and dimensions of parking slot objects, a number of parking slot objects represented by the parking sequence object.

Optionally, the method further comprises: obtaining a user modification of the orientation angle, whereby obtaining a modified parking sequence object; determining a second plurality of parking slot objects represented by the modified parking sequence object; and presenting over the map the second plurality of parking slot objects instead of the plurality of parking slot objects.

Optionally, a number of parking slot objects in the second plurality of parking slot objects is different than a number of parking slot objects in the plurality of plurality of parking slot objects.

Optionally, said determining the orientation angle is performed automatically based on information from the map.

Optionally, said determining the orientation angle is performed automatically based an orientation angle of one or more other parking sequence objects defined over the map.

Optionally, said determining the orientation angle comprises obtaining the orientation angle from the user.

Optionally, the parking slot detection model is trained to identify parking sequence objects based on the parking sequence object, in addition to being trained to identify parking slot objects based on the plurality of parking slot objects.

Optionally, the parking sequence object is a compact representation of the plurality of parking slot objects, whereby storage volume utilized in storing parking sequence objects is reduced compared to storage volume utilized for storing a corresponding set of plurality of parking slot objects.

Optionally, the map is a satellite image.

Another exemplary embodiment of the disclosed subject matter is a computerized apparatus having a hardware processor, the processor the hardware processor being coupled to a memory, being hardware processor adapted to perform the steps of: presenting the map to a user, the map representing an overhead view of a at least partially drivable area; defining a parking sequence object in the map, wherein said defining comprises: obtaining a user selection in the map of a start point and of an end point; and determining an orientation angle; determining, based on the parking sequence object, a plurality of parking slot objects, the plurality of parking slot objects are equidistant along a line defined between the start point and the end point, the plurality of parking slot objects are positioned in an identical angle with respect to the line, wherein the identical angle is defined based on the orientation angle; presenting over the map the plurality of parking slot objects; and utilizing the plurality of parking slot objects in training a parking slot detection model, the parking slot detection model is a digital product that is configured to identify parking slots in maps.

Yet another exemplary embodiment of the disclosed subject matter is a computer program product comprising a non-transitory computer readable storage medium retaining program instructions, which program instructions when read by a processor, cause the processor to perform a method comprising: presenting the map to a user, the map representing an overhead view of a at least partially drivable area; defining a parking sequence object in the map, wherein said defining comprises: obtaining a user selection in the map of a start point and of an end point; and determining an orientation angle; determining, based on the parking sequence object, a plurality of parking slot objects, the plurality of parking slot objects are equidistant along a line defined between the start point and the end point, the plurality of parking slot objects are positioned in an identical angle with respect to the line, wherein the identical angle is defined based on the orientation angle; presenting over the map the plurality of parking slot objects; and utilizing the plurality of parking slot objects in training a parking slot detection model, the parking slot detection model is a digital product that is configured to identify parking slots in maps.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
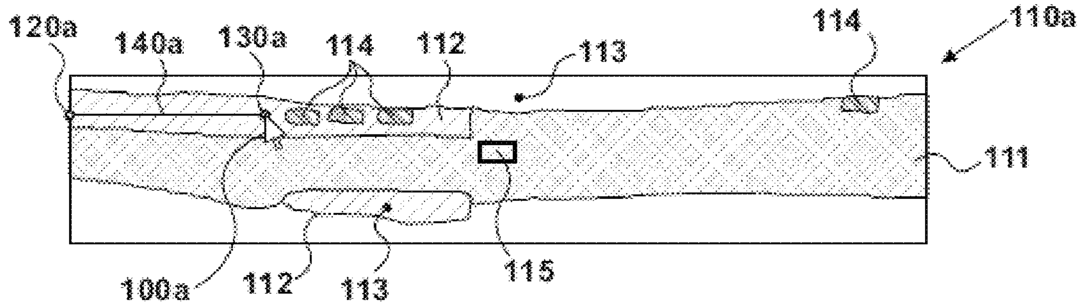
FIGS. 1A-1C show schematic illustrations of an exemplary map, in accordance with some exemplary embodiments of the disclosed subject matter.

One technical problem dealt with by the disclosed subject matter is to improve automatic identification and localization of valid parking slots, particularly in unstructured parking areas. Parking spaces may not always be clearly defined or structured, especially in open spaces or unconventional parking scenarios. Automatic parking techniques may face challenges in unstructured parking areas due to several reasons, such as lack of clear boundaries, variability in parking layout, existing of obstacles and irregularities, unexpected environmental conditions, or the like. Unstructured parking areas may lack clearly defined boundaries for individual parking spaces. Without clear markings or delineations, it may become difficult for both automatic parking systems to identify and navigate to available parking slots and for human drivers to select appropriate parking locations that provide efficient space utilization of the parking area.

Another technical problem dealt with by the disclosed subject matter is to enable dynamic annotation of parking slot without reliance on pre-defined on-surface markings, such as road markings outlining parking boundaries. In some exemplary embodiments, parking slots may exhibit diverse designs, including parallel, perpendicular, tilted spaces, or hybrid layouts within the same parking area. One parking area may be arranged in multiple arrangements, thereby accommodating different number of parking slots, in different orientations, different arrangement, or the like. It may be required to enable dynamic adjustment of parking configurations to suit different needs and accommodate varying numbers of vehicles.

Yet another technical problem dealt with by the disclosed subject matter is to efficiently train parking slot detection models, and specially ANN-based object detection models to identify parking slot objects. Technical solutions, such as the solutions disclosed in patent application U.S. Ser. No. 18/609,536, titled: “PARKING SPOT DETECTION”, filed on Mar. 19, 2024, which is hereby incorporated by reference in its entirety without giving rise to disavowment; may utilize elevated perception maps and ANN-based object detector for automatically identifying parking slot objects. The elevated perception maps may be utilized to represent the surrounding area around a vehicle. The elevated perception map may comprise multiple functional layers. Each pixel in the elevated perception map may be associated with a predetermined relative location to the vehicle. The elevated perception map may comprise a plurality of functional layers. The values of pixels at different layers may indicate infrastructure segments or objects located at corresponding relative locations to the vehicle, such as driving paths infrastructure layers, parking area segmentation layer, vehicle object layer, pedestrian layers, or the like. These layers aid in identifying parking areas and classifying parking slots based on the presence of other vehicles or objects or availability of parking areas in the surrounding area. An ANN may be utilized to detect parking slot objects within the elevated perception maps. The ANN may be trained to detect parking slot objects within the parking area segmentation layer, which is indicative of sub-areas in the surrounding area around the vehicle in which vehicles can park.

One technical solution is to perform annotation of sequences of parking slots, using minimal input, start and end points, and orientation angle, with the system then automatically generating annotations for individual parking slots based on this information. In some exemplary embodiments, a user, e.g., an annotator may be enabled to mark over a map two points defining a parking segment: a start and an end point thereof. A parking segment, also referred to as a parking sequence object, may be a continuous area that contains multiple parking slots arranged adjacently. A “skeleton”, which is a line connecting the start and end points of the parking segment may be generated. This line passes through the center points of all the individual parking slots within the parking segment. Additionally, or alternatively, the annotator may be enabled to specify the orientation angle of the parking segment relative to the line. The orientation angle may be utilized to determine the arrangement of the parking slots within the parking segment. As an example, an angle of 0° corresponds to parallel parking slots, while an angle of 90° corresponds to perpendicular parking slots. Once the start and end points, along with the orientation angle, are provided, the system may automatically generate annotations for all individual parking slots within the parking segment. These annotations may be derived from the line and orientation information.

In some exemplary embodiments, the annotated parking segment, e.g., the parking sequence object, or the plurality of parking slot objects may be utilized in training a parking slot detection model. The parking slot detection model may be a digital product that is configured to identify parking slots in maps. In some exemplary embodiments, the parking slot detection model may be an ANN-based model. The parking slot detection model may be trained to identify first object type representing a sequence of one or more parking slots, e.g., parking sequence objects, and a second object type representing a single parking slot object. In some cases, objects from the first object type which represents a consecutive sequence of one or more parking slots within the parking area, may be a grouping of parking slots that are adjacent to each other or arranged in a specific pattern, or equidistant along a symmetry line, or the like. The parking slot detection model may be trained to identify and delineate these sequences, enabling it to understand the spatial layout of parking areas and recognize larger patterns of available parking spaces. Detecting sequences of parking slots can be particularly useful in scenarios where parking slots are organized in rows or designated sections within a parking lot. The parking slot detection model may further be trained to identify and classify individual parking slots (the second type of parking slot objects), within the sequences of parking slots, or identifying sequences of parking slots of size one. The parking slot detection model may further be trained to determine their occupancy class (vacant, occupied, blocked) based on the information available in the elevated perception maps.

It may be noted that the disclosed technical solution may be applied to other non-parking-related cases, such as annotation of objects having varying sizes and orientations affected by multiple factors. As an example, to perform annotation of sequences of package locations for storage in an automated storage house, using minimal input, start and end points, and orientation angle, or the like.

One technical effect of utilizing the disclosed subject matter is improving computational resources utilization. Utilizing parking sequence objects to represent plurality of parking slots may provide a more efficient and compact representation of parking slots, reduce storage volume utilized in storing parking information. The storage volume utilized for sequence objects representation is reduced compared to storage volume utilized for storing a corresponding set of plurality of parking slot objects.

Another technical effect of utilizing the disclosed subject matter is providing flexibility in defining parking area dimensions while maintaining efficiency and accuracy in annotation of such parking slots. The disclosed solution does not rely on prior assumptions about road markings, parking slot orientation, or size. It directly detects parking slots, making it adaptable to a wide variety of parking lots with different markings or no markings at all. The disclosed subject matter is a single solution that can be seamlessly utilized for all scenarios including paved and non-paved parking areas, without having to identify the specific relevant scenario.

Yet another technical effect of utilizing the disclosed subject matter is enhancing the accuracy, precision of parking slot detection systems in autonomous parking applications, especially in urban areas. The disclosed subject matter enables the accurate detection and localization of parking slot objects through the generation of the perception maps. By dynamically generating the perception map s based on accurate maps that are dynamically updated based on real-time sensor data obtained from sensors mounted on the vehicle, the system ensures accurate and up-to-date information about the surrounding environment. This robust perception enhances the system's responsiveness and reliability in navigating complex driving scenarios. This adaptive representation enhances the versatility of the system, enabling it to adapt to different driving environments and scenarios.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 1B:
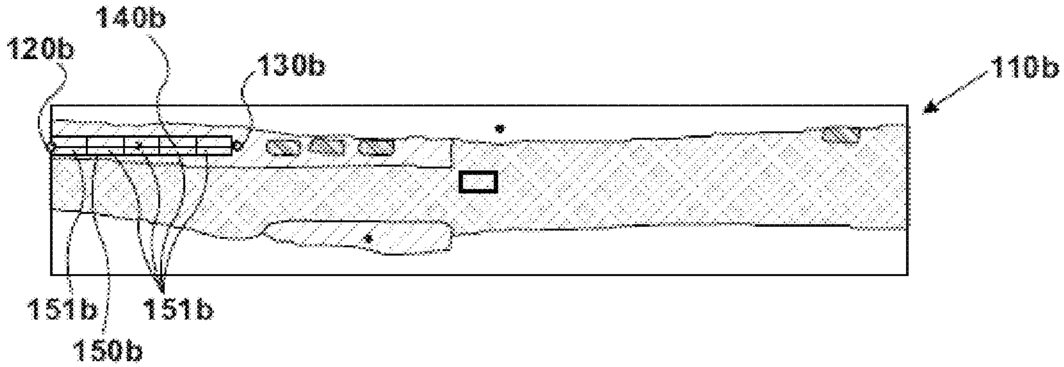
Figure 1C:
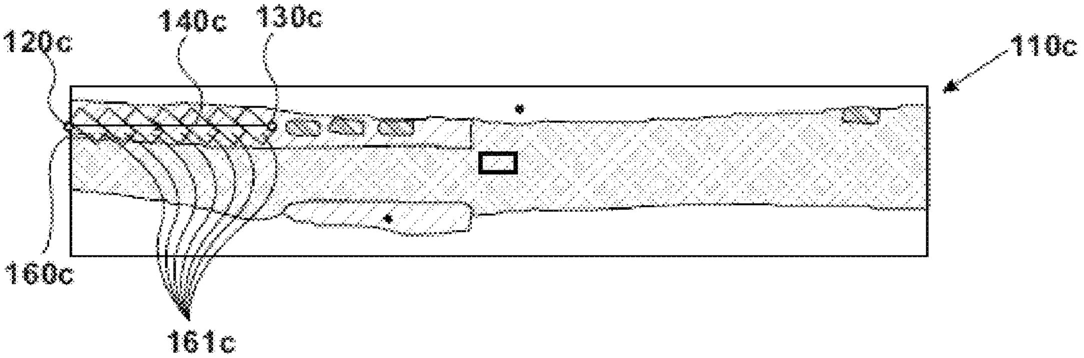

Referring now to FIGS. 1A-1C showing schematic illustrations of exemplary maps, in accordance with some exemplary embodiments of the disclosed subject matter.

Map **110*a* may be a visual representation of an overhead view of a partially drivable area. In some exemplary embodiments, Map 110*a* may be a perception map that represents the environment around a vehicle (115) or another observer. Map 110*a* may comprise representations of streets, drivable roads (111), parking lots (112), pedestrians (113), parking vehicles (114), driving vehicles (115), obstacles, other relevant areas where vehicles can maneuver, or the like. It may be noted that Map 110*a* may be provided in different types of representations, such as geographical maps, perception maps, images, or the like; and of different types of partially drivable areas, such as in urban areas, in interurban area, open spaces, or the like. As an example, Map 110*a* may be a map of an urban area, showing streets, intersections, and parking lots. As another example, Map 110*a* may be an aerial view of an area, displaying roads, parking areas, buildings, or the like. as yet another example, Map 110*a* may be a satellite image of a suburban neighborhood, illustrating streets, driveways, residential parking spaces, or the like. As yet another example, Map 110*a* may be a schematic diagram of a parking layout, indicating parking slots, driving lanes, entrance/exit points, or the like. As yet another example, Map 110*a*** may be designed to support autonomous driving, parking assistance, advanced driver assistance systems (ADAS), or the like.

Additionally, or alternatively, Map **110*a* may be an elevated map, captured from an elevated viewpoint, such as from above Vehicle 115, from the sky, from an airplane, from a drone, or the like. Additionally, or alternatively, Map 110*a*** may be generated based on data captured from other viewpoints.

In some exemplary embodiments, the map may comprise a plurality of segmentation layers. Each layer may be configured to indicated a different type of element of the surrounding area around the Vehicle 115. Such elements may comprise infrastructure elements, such as roads (111), parking areas (112), lanes, paths, crosswalks, or the like.

Additionally, or alternatively, the elements may comprise objects, such as vehicles (114), pedestrians (113), signs, obstacle, or the like. In some exemplary embodiments, the map may be presented with a different visual indication to different layers, as an example, a parking area segmentation layer may be presented with a different color or pattern than a driving area segmentation layer.

Additionally, or alternatively, Map 110*a* may be a satellite image. The satellite image may be an image of Earth collected by imaging satellites operated by governments or businesses around the world, such as Apple Maps image, Google Maps, image, or the like. Satellite images may be captured using cameras or sensors mounted on satellites or other related observers. Satellite images may provide bird's-eye view of large areas of roads, driving environments, urban areas, or the like. Additionally, or alternatively, the map may be generated based on satellite images, in addition to or instead of sensor data. The images may be processed and analyzed to identify infrastructure segments, objects, and other features relevant to parking slot detection and autonomous driving. Additionally, or alternatively, other types of maps may be utilized, such as High-Definition (HD) maps, regular road maps, or the like.

In some exemplary embodiments, a user may be enabled to select using a designated widget, such as Pointer 100*a*, a Start Point 120*a* and an End Point 130*a* on Map 110*a*. Start Point 120*a* and End Point 130*a* may be located in locations in Map 110*a* that are defined as parking areas (112). The Line 140*a* connecting between Start Point 120*a* and End Point 130*a* may be configured to define a basis on which the parking sequence object to be defined thereon. It may be noted that the entirety of Line 140*a* is required to be located in a parking area in order to validate that all the parking slot objects are located in parkin areas.

In some exemplary embodiments, a parking sequence object, such as Parking Sequence Object 150*b* or 160*c* may be automatically defined between Start Point 120*a* and End Point 130*a*. The parking sequence object may comprise a plurality of parking slot objects. The plurality of parking slot objects may be equidistant along Line 140*a*, such as Slots 151*b* along Line 140*b*, and Slots 161*c* along Line 161*c*.

In some exemplary embodiments, an orientation angle of the parking sequence object may be determined. In some cases, the orientation angle may be selected by the user, or in a manner enabling a convenient parking in accordance with the drivers' preferences, or the like. Additionally, or alternatively, the orientation angle may be determined in a manner maximizing the number of parking slots in the parking sequence object. Additionally, or alternatively, the orientation angle may be determined based on properties of the parkable area in which Start Point 120*a* and End Point 130*a* are located, such as the width thereof, boundaries, or the like. It may be noted that the plurality of parking slot objects may be all positioned in an identical angle with respect to Line 140*a*. The identical angle may be defined based on the orientation angle. As an example, Map 100*b* presents a Parking Sequence Object 150*b*, with an orientation angle having a value of 0° with respect to Line 140*b*.

In some exemplary embodiments, in response to the user modifying the orientation angle, a modified parking sequence object may be defined. As an example, Map 100*c* presents a Parking Sequence Object 160*c*, with an orientation angle having a value of 140° with respect to Line 140*c*. The number of parking slot objects in Parking Sequence Object 150*b* is 5, while the number of parking slot objects in Parking Sequence Object 160*c* is 7.

Figure 2:
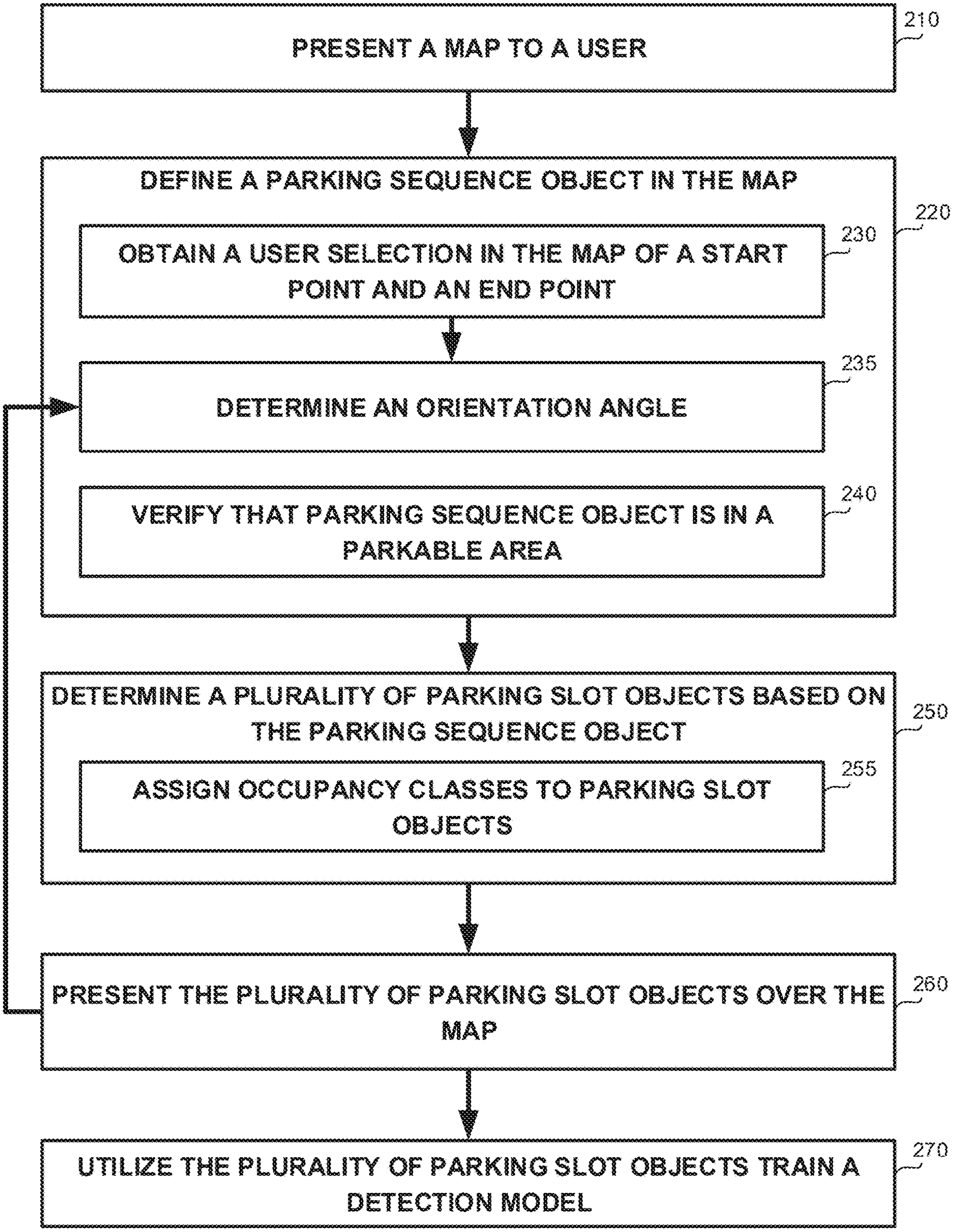
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, a map representing an overhead view of at least partially drivable area may be presented to a user. In some exemplary embodiments, the map may comprise representations of streets, drivable roads, parking lots, pedestrians, parking vehicle, driving vehicles, obstacles, or other relevant areas where vehicles can maneuver. The user may be a human annotator or professional responsible for parking slot annotations, training data of parking slot detection models, software developer, or the like.

In some exemplary embodiments, the map may be represented to the user through a graphical user interface (GUI) of a software application that enables the user to interact with the map, such as using a pointer device (e.g., mouse, touchpad) to select points, draw lines, or perform other actions.

On Step 220, a parking sequence object may be defined in the map. The parking sequence object may be a digital representation of a sequence or a series of parking slot objects within the map. The parking sequence object may be designed to facilitate the systematic annotation and arrangement of parking slots or spaces within a designated area in the map. The parking sequence object may comprise two or more parking slot objects, indicating their positions and orientations.

In some exemplary embodiments, the parking sequence object may be defined by obtaining user input or user-defined parameters, such as a start point, an end point (Step 230), an orientation angle (Step 235), or the like. These parameters may delineate the trajectory along which parking slots are arranged. The parking slot objects in each parking sequence object may be evenly distributed along the trajectory defined by the start and end points of the parking sequence object. The parking slot objects in each parking sequence object may be positioned at an identical angle with respect to the trajectory, ensuring a consistent arrangement of parking slots.

Additionally, or alternatively, the user input may comprise other parameters that define the spatial arrangement and characteristics of parking slots within a designated area of interest, such as a line indicative of the spatial arrangement of the parking slots, by manually drawing or defining the area of the parking sequence object within the map, or the like. Additionally, the user may provide input regarding the orientation angle, which influences the alignment of the parking slots relative to the defined path between the start and end points.

On Step 230, a user selection in the map of a start point and of an end point may be obtained. The user selection may involve interacting with a GUI presented on a device such as a computer, tablet, a smartphone, or the like. The GUI may be utilized to display the map to the user, and to provide tools or controls specifically designed for selecting start and end points on the map, such as by interacting with designated widgets, mouse clicks, touch gestures, stylus input to select the start and end points on the map displayed on the GUI. Visual feedback may be provided to users during the selection process, such as highlighting or marking the selected points on the map to confirm their choices.

In some exemplary embodiments, the start point and the end point are located in locations defined in the parking area segmentation layer as parking areas. By restricting the selection of start and end points to designated parking areas, the system ensures that the parking sequence object accurately represents parking slots within the intended parking zones.

On Step 235, an orientation angle may be determined. The orientation angle may be the angle at which the parking slots are positioned relative to a specified path within the parking sequence object. This angle determines the alignment of the parking slots along the designated path, ensuring a consistent arrangement within the map representation.

In some exemplary embodiments, the orientation angle may be obtained from the user. Users can provide the orientation angle through various means, such as by directly entering the desired orientation angle within a numerical input field, by visually adjusting the orientation angle on the map, or the like.

Additionally, or alternatively, determining the orientation angle may be performed automatically based on information from the map. As an example, the orientation angle may be determined based on road patterns, landmarks, or other features in the map data. The orientation of such elements may be utilized to estimate the orientation angle.

Additionally, or alternatively, determining the orientation angle may be performed automatically based an orientation angle of one or more other parking sequence objects defined over the map, such as for maintaining consistency, symmetry, or the like.

Additionally, or alternatively, the orientation angle may be determined automatically based on an orientation angle a parking vehicle in the parking area in which the parking sequence object is being defined. The alignment of parked vehicles within the parking area may be utilized as a reference for inferring the orientation angle of parking sequence object, as all of the parking slots within the parking sequence object are equidistant along the line defined between the start point and the end point in an identical angle with respect to the line. Accordingly, the existence of a parked vehicle forces the orientation angle. Additionally, or alternatively, the existence of a parked vehicle may also force a location of other parking slot objects within the parking sequence object.

On Step 240, a verification that the plurality of parking slot objects are located in a continuous parkable area may be performed. The verification may be performed by verifying that each point in the line defined by the start point and the end point is located in a location defined in the parking area segmentation layer as parking areas.

On Step 250, a plurality of parking slot objects may be determined based on the parking sequence object. The plurality of parking slot objects may be equidistant along a line defined between the start point and the end point. The plurality of parking slot objects may be oriented in a consistent manner relative to the line. This uniform orientation may be determined based on the orientation angle specified for the parking sequence object. Each parking slot object within parking sequence object may be positioned at the same angle with respect to the line, ensuring that all parking slots are aligned in a uniform direction within the parking segment. This alignment facilitates efficient use of space and helps automatic driving system or human drivers navigate the parking area more easily.

In some exemplary embodiments, a number of parking slot objects represented by the parking sequence object may be determined based on several factors, such as including the orientation angle, the length of the line, the dimensions of the parking slot object, or the like. As the orientation angle defines the arrangement of parking slots within the parking sequence object, it may affect the number of parking slot objects that fit within the area defined the parking sequence object. For example, if the orientation angle is 0°, indicating parallel parking slots, the number of parking slots may be determined differently than if the angle is 90°, indicating perpendicular parking slots. Similarly, the length of the line, or the distance between the start and end points determines the overall span of the parking sequence object. A longer line may accommodate more parking slots compared to a shorter one, assuming other factors remain constant. The dimensions of the parking slot object, such as width and length, may also affect how many slots can fit within the parking sequence object.

On Step 255, an occupancy class may be determined for each parking slot object of the plurality of parking slot objects. The occupancy class of the parking slot object may be selected from a group including at least a vacant parking class and an occupied parking class.

In some exemplary embodiments, occupancy class of the parking slot object may be determined based on an occupancy class of the parking sequence object. The occupancy class of the parking sequence object may be defined by the user, may be set with a default value, or the like. The occupancy class of the parking sequence object may be selected from a group including at least a vacant parking class and an occupied parking class.

In some exemplary embodiments, a default occupancy class may be determined for all parking slot objects. The user may be enabled to modify the default occupancy class of each particular parking slot object separately.

Additionally, or alternatively, an occupancy class for each parking slot object of the plurality of parking slot objects may be determined automatically based on the map. The user may be enabled to modify the automatically determined occupancy class of each particular parking slot object separately.

On Step 260, the plurality of parking slot objects may be presented over the map. In some exemplary embodiments, different colors may be utilized to indicate different occupancy classes of the parking slot objects. The markings of the plurality of parking slot objects may be of adjacent rectangle shapes rotated in accordance with the orientation angle. A special marking may be utilized for marking the defining line of the parking sequence object.

On Step 270, the plurality of parking slot objects may be utilized in training a parking slot detection model. The parking slot detection model may be a digital product that is configured to identify parking slots in maps. The parking slot detection model may be trained to identify parking sequence objects based on the parking sequence object, in addition to being trained to identify parking slot objects based on the plurality of parking slot objects.

In some exemplary embodiments, the parking slot detection model being trained using the plurality of parking slot objects may be an ANN-based model. The ANN-based model may be designed as a deep neural network, CNNS, consisting of multiple layers of interconnected neurons, or the like. It may be noted that parking slot objects may be regarded or considered as physical objects for the purpose of visual detection in this context techniques, despite not having physical features. The outputted detected parking slot objects may be utilized in various ways, such as by autonomous driving system of the vehicle, enabling autonomous parking, or the like.

Additionally, or alternatively, the parking slot detection model being trained using the plurality of parking slot objects may be utilized to detect parking slot objects within elevated perception maps, that are described in in patent application U.S. Ser. No. 18/609,536, titled: "PARKING SPOT DETECTION", filed on Mar. 19, 2024, which is hereby incorporated by reference in its entirety without giving rise to disavowment. Such parking slot detection model may be trained to detect parking slot objects within a parking area segmentation layer, which is indicative of sub-areas in the surrounding area around the vehicle in which vehicles can park. Such sub-areas may comprise parking blobs that can be subdivided into a plurality of parking slots. The parking slot detection model may be configured to determine locations of parking slot objects within areas that are segmented as parking areas according to the parking area segmentation layer.

Additionally, or alternatively, the parking slot detection model being trained using the plurality of parking slot objects may be trained to detect an occupancy class of each detected parking slot object. The occupancy statuses may be vacant parking slot class, occupied parking status, or the like. The occupancy class of the parking slot object may be determined based on the class of other objects in parking slot object in the parking sequence object, or based on information from the map, or the like. As an example, the plurality of functional layers of the elevated perception map may comprise a vehicle object layer that is indicative of other vehicles that are present in the surrounding area of the vehicle. The parking slot objects occupancy class may be classified as occupied or vacant based on the other vehicles identified based on the vehicle object layer.

In some exemplary embodiments, the parking slot detection model being trained using the plurality of parking slot objects may be trained to identify first object type representing parking sequence objects, and a second object type representing a single parking slot object. In some cases, the slot detection model may be trained to identify and delineate the parking sequence object, enabling it to understand the spatial layout of parking areas and recognize larger patterns of available parking spaces. Detecting sequences of parking slots can be particularly useful in scenarios where parking slots are organized in rows or designated sections within a parking lot. The slot detection model may further be trained to identify and classify individual parking slots (the second type of parking slot objects), within the sequences of parking slot objects, or identifying sequences of parking slots of size one. The slot detection model may further be trained to determine their occupancy class (vacant, occupied, blocked, or the like) based on the information available in the maps.

Figure 3A:
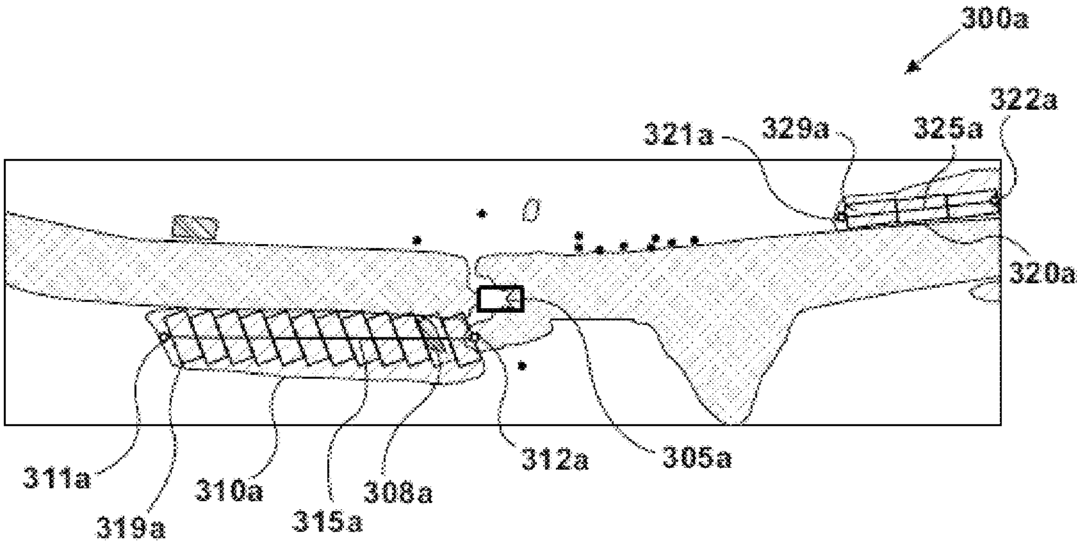
FIGS. 3A-3B show schematic illustrations of exemplary maps and markings of annotated parking sequence objects thereon, in accordance with some exemplary embodiments of the disclosed subject matter.

Referring now to FIG. 3A showing schematic illustration of an exemplary map and markings of annotated parking sequence objects thereon, in accordance with some exemplary embodiments of the disclosed subject matter.

Map 300*a* may represent an overhead view of a at least partially drivable area, similar to Maps 100*a*-100*c* presented in FIGS. 1A-1C. Multiple parking sequence objects may be displayed on Map 300*a*, such as Parking Sequence Object 310*a* and Parking Sequence Object 320*a*. Each of Parking Sequence Object 310*a* and Parking Sequence Object 320*a* may be defined based on a start point and an end point (311*a* and 312*a*; 321*a* and 322*a*; respectively). The start and end points may be manually selected by a user, as described in Step 230 in FIG. 2 and in FIG. 1A. Each of Parking Sequence Object 310*a* and Parking Sequence Object 320*a* may comprise a plurality of parking slot objects (such as 319*a* and 329*a*) that are equidistant along a line (315*a* and 325*a*, respectively) defined between the start point and the end point (311*a* and 312*a*; 321*a* and 322*a*; respectively).

In some exemplary embodiments, each of Parking Sequence Object 310*a* and Parking Sequence Object 320*a* may have an orientation angle. The orientation angle may be determined based on input provided by the user, or based on properties of the parking area, such as the size of the parking area, the size of the parking vehicle, the required number of parking objects, parking preferences, or the like. The plurality of parking slot objects in each of Parking Sequence Object 310*a* and Parking Sequence Object 320*a* may be positioned in an identical angle with respect to the defining line (315*a* and 325*a*, respectively). The identical angle may be defined based on the orientation angle determined for the parking sequence object.

In some exemplary embodiments, the orientation angle may be determined in accordance with an orientation of an existing parking vehicle within the parking area that the parking sequence object is being defined therein. As an example, the orientation angle of Parking Sequence Object 310*a* is forced to be in a value enabling the plurality of parking slot objects to be positioned in angles identical to the angle Vehicle 308*a* is positioned.

Additionally, or alternatively, instead of obtaining start and end points, the length of Line 315*a* and Line 325*a* may be determined based on the orientation angle, along with the dimensions of parking slot objects, a number of parking slot objects represented by the parking sequence object, or the like. As an example, Line 325*a* may be respective of 3 parking slot objects given a parallel parking orientation angle.

Figure 3B:
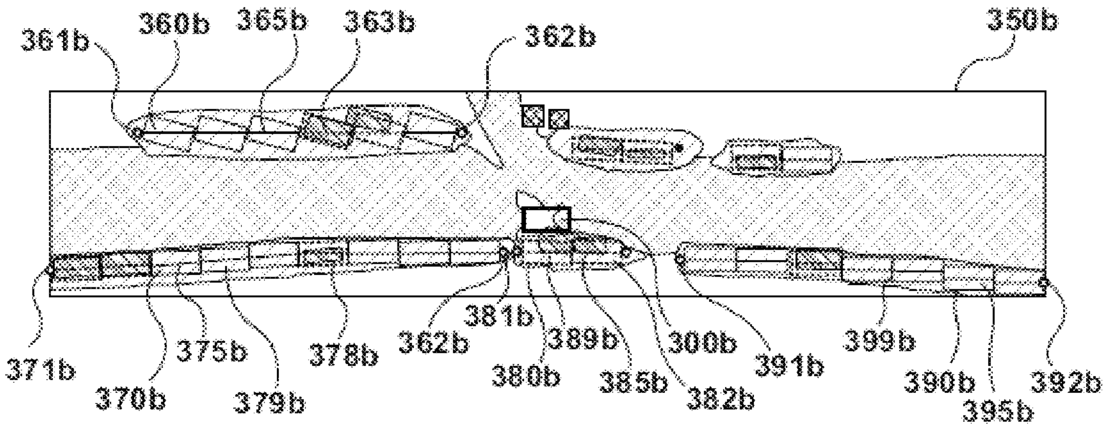

Referring now to FIG. 3B showing schematic illustration of an exemplary map and markings of annotated parking sequence objects thereon, in accordance with some exemplary embodiments of the disclosed subject matter.

Map 350*b* may represent an overhead view of a at least partially drivable area, similar to Maps 100*a*-100*c* presented in FIGS. 1A-1C. Multiple parking sequence objects may be displayed on Map 350*b*, such as Parking Sequence Object 360*b*, Parking Sequence Object 370*b*, Parking Sequence Object 380*b* and Parking Sequence Object 390*b*. Each of the parking sequence objects 360*b*, 370*b*, 380*b* and 390*b* may be defined based on a start point and an end point (361*b* and 362*b*, 371*b* and 372*b*, 381*b* and 382*b*; 391*a* and 392*b*; respectively). The start and end points may be manually selected by a user, as described in Step 230 in FIG. 2 and in FIG. 1A. Each of the parking sequence objects 360*b*, 370*b*, 380*b* and 390*b* may comprise a plurality of parking slot objects (such as 379*b* and 399*b*) that are equidistant along a line (365*b*, 375*b*, 385*b* and 395*b*, respectively) defined between the start point and the end point thereof. It may be noted that each of start and end point 361*b* and 362*b*, 371*b* and 372*b*, 381*b* and 382*b*; 391*a* and 392*b* of each of parking sequence objects 360*b*, 370*b*, 380*b* and 390*b* is required to be located in a in locations defined as parking area segmentation layer in Map 350*b*. It may be also required that each point in the line defined by the start point and the end point, such as Line 365*b* defined by Start Point 361B and End Point 362*b*, is located in a location defined in the parking area segmentation layer, so as to verifying that the plurality of parking slot objects comprised by Parking Sequence Object 360*b* are located in a continuous parkable area. However, it may not always be applicable. As an example, both Start Point 381*b* and End Point 382*b* are located within parking area segmentation layer in Map 350*b*, so are all the points in Line 385*b*. However, Parking Slot Object 389*b* is not located entirely in a continuous parkable area. In such a case, Parking Slot Object 389*b* may be marked differently, or classified as non-applicable parking slot, or the like.

It may be noted that it may be easier to utilize Parking Sequence Object 360*b* for example, as a compact representation of a plurality of parking slot objects, instead of storing the corresponding set of the plurality of parking slot objects therein.

In some exemplary embodiments, an occupancy class may be assigned for each parking sequence object. The occupancy class may be selected from a group including at least a vacant parking class, an occupied parking class, a non-applicable parking class, or the like. In some exemplary embodiments, an occupancy class may be determining for each parking slot object of the plurality of parking slot objects separately. A default occupancy class may be determined for all parking slot objects within the parking sequence object, then the user may be enabled to modify the default occupancy class of a parking slot object. As An example, the default occupancy class may be vacant and the user may be enabled to manually modify the occupancy class of Parking Slot Object 363*b* to occupied. Additionally, or alternatively, an occupancy class for each parking slot object of the plurality of parking slot objects may be automatically determined based on the map, and then the user may be enabled to modify the automatically determined occupancy class of a parking slot object. As an example, the occupancy class of each of the parking slot objects in Parking Sequence Object 370*b* may be determined automatically based on visual analysis techniques, machine learning, object detections, or the like, of Map 350*b*, so 378*b* may be assigned with occupied while 379*b* with vacant.

Figure 4:
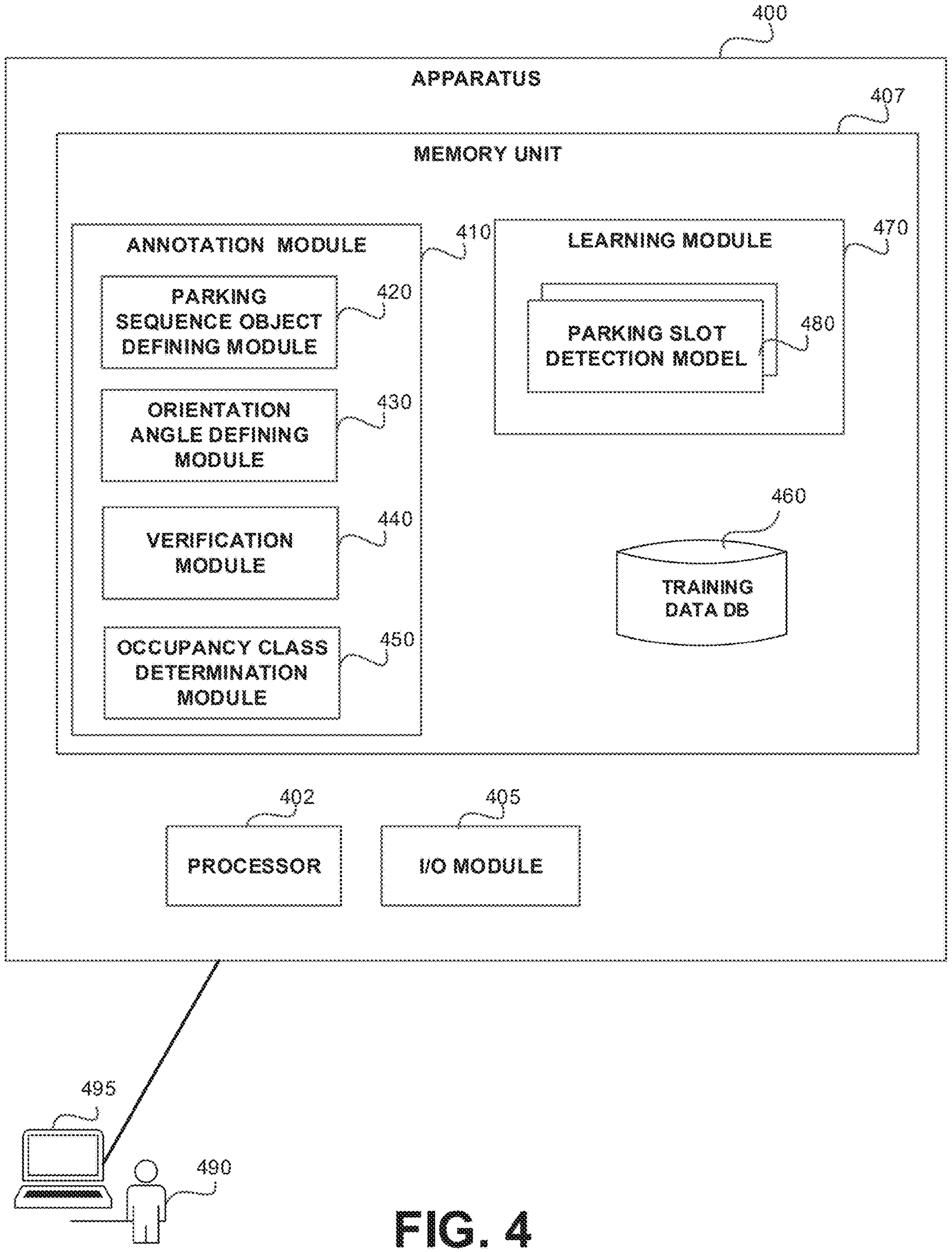
FIG. 4 shows a block diagram of apparatuses, in accordance with some exemplary embodiments of the disclosed subject matter.

Referring now to FIG. 4 showing a block diagram of apparatuses, in accordance with some exemplary embodiments of the disclosed subject matter.

An Apparatus 400 may be configured to support annotating parking slots in maps, and training of parking slot detection models, in accordance with the disclosed subject matter. In some exemplary embodiments, Apparatus 400 may comprise one or more Processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of its subcomponents.

In some exemplary embodiments of the disclosed subject matter, Apparatus 400 may comprise an Input/Output (I/O) module 405. I/O Module 405 may be utilized to provide an output to and receive input from a User 490, a Device 495, a sensor, a vehicle, or the like, such as, for example presenting maps to User 490 via Device 495, similar to Maps 110*a*, 110*b* and 110*c* presented in FIGS. 1A-1*c*, Maps 310*a* and 350*b* presented in FIGS. 3A and 3B, or the like, providing training data to other devices, or the like.

In some exemplary embodiments, Apparatus 400 may comprise Memory 407. Memory 407 may be a hard disk drive, a Flash disk, a Random-Access Memory (RAM), a memory chip, or the like. In some exemplary embodiments, Memory 407 may retain program code operative to cause Processor 402 to perform acts associated with any of the subcomponents of Apparatus 400.

In some exemplary embodiments, Annotation Module 410 may be configured to annotating parking slots in maps by integrating the functionalities of Parking Sequence Object Detection Module 420, and Orientation Angle Defining Module 430. Parking Sequence Object Detection Module 410 may be configured to facilitates user interaction by enabling the selection of start and end points within the map, delineating the area where parking sequence objects will be defined. Users, such as User 490, can utilize a GUI in Device 495 to interact with the map, selecting points that mark the beginning and end of a parking segment. These points serve as the foundational elements for defining the trajectory or the line along which parking slot objects will be arranged. Orientation Angle Defining Module 430 may be configured to define the orientation angle for the parking sequence object, which influences the alignment of parking slots within the defined segment. It may obtain the orientation angle from User 490 via I/O Module 405, or automatically based on map information or existing parking sequence objects.

Verification Module 440 may be configured to verify that the selected start and end points define a continuous parking area within the map. It ensures that all parking slot objects are located in a continuous parkable area, enhancing the accuracy of the annotation process.

Occupancy Class Determination Module 450 may be configured to determine the occupancy class for each parking slot object within the parking sequence object. It assigns occupancy classes such as vacant or occupied based on user input or automated analysis of map data.

Learning Module 470 may be configured to utilize annotated parking slot sequence objects for training one or more Parking Slot Detection Models 480 to identify objects representing sequences of one or more parking slots, or to identify objects of single parking slot objects. Additionally, or alternatively, Learning Module 470 to train Parking Slot Detection Models 480 to detect occupancy classes of each detected parking slot object. Additionally, or alternatively, data obtained from annotation Module 410 may be stored in designated Databases 460 for future training of other detection models, for annotation, or the like.

It is noted that the disclosed subject matter is not limited to parking slot annotations. In some exemplary embodiments, a skeleton can be applied to annotate other objects that are sequentially arranged. As an example, one may utilize a skeleton object to annotate available slots to insert totes in a warehouse, e.g., on shelves. As another example, a container terminal can be annotated with locations where cargo containers can be placed, identifying specific sets of cargo containers, or the like. As yet another example, sequence of similar objects may be annotated in supermarket aisles, library shelves, vineyards and orchards, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for annotating parking slots in a map, the method comprising:

presenting the map to a user, the map representing an overhead view of an at least partially drivable area;

defining a parking sequence object in the map, the parking sequence object comprising a plurality of parking slot objects, wherein said defining comprises:

obtaining, from the user, a user selection in the map of a start point and of an end point, wherein the parking sequence object is between the start point and the end point; and determining an orientation angle of the parking sequence object;

determining, based on the parking sequence object, the plurality of parking slot objects, the plurality of parking slot objects are equidistant along a line defined between the start point and the end point, the plurality of parking slot objects are positioned in an identical angle with respect to the line, wherein the identical angle is defined based on the orientation angle;

presenting over the map the plurality of parking slot objects; and utilizing the plurality of parking slot objects in training a parking slot detection model, the parking slot detection model is a digital product that is configured to identify parking slots in maps.

2. The method of claim 1, wherein the map is a perception map, the perception map comprises at least a parking area segmentation layer and a driving area segmentation layer, wherein the perception map is presented with a different visual indication to different layers.

3. The method of claim 2, wherein the start point and the end point are located in locations defined in the parking area segmentation layer as parking areas.

4. The method of claim 2, wherein said obtaining the user selection comprises verifying that each point in the line defined by the start point and the end point is located in a location defined in the parking area segmentation layer as parking areas, whereby verifying that the plurality of parking slot objects is located in a continuous parkable area.

5. The method of claim 1, wherein said defining the parking sequence object comprises defining an occupancy class of the parking sequence object, the occupancy class of the parking sequence object is selected from a group including at least a vacant parking class and an occupied parking class, wherein said determining the plurality of parking slot objects comprises assigning to each parking slot object of the plurality of parking slot objects the occupancy class of the parking sequence object.

6. The method of claim 1, wherein said determining the plurality of parking slot objects comprises: determining for each parking slot object of the plurality of parking slot objects an occupancy class, the occupancy class of the parking sequence object is selected from a group including at least a vacant parking class and an occupied parking class.

7. The method of claim 6, wherein said determining for each parking slot object the occupancy class comprises:

determining a default occupancy class for all parking slot objects; and enabling the user to modify the default occupancy class of a parking slot object.

8. The method of claim 6, wherein said determining for each parking slot object the occupancy class comprises:

automatically determining, based on the map, an occupancy class for each parking slot object of the plurality of parking slot objects; and enabling the user to modify the automatically determined occupancy class of a parking slot object.

9. The method of claim 1, wherein said determining the plurality of parking slot objects comprises determining, based on the orientation angle, a length of the line and dimensions of parking slot objects, a number of parking slot objects represented by the parking sequence object.

10. The method of claim 1 further comprises:

obtaining a user modification of the orientation angle, whereby obtaining a modified parking sequence object;

determining a second plurality of parking slot objects represented by the modified parking sequence object; and presenting over the map the second plurality of parking slot objects instead of the plurality of parking slot objects.

11. The method of claim 10, wherein a number of parking slot objects in the second plurality of parking slot objects is different than a number of parking slot objects in the plurality of plurality of parking slot objects.

12. The method of claim 1, wherein said determining the orientation angle is performed automatically based on information from the map.

13. The method of claim 1, wherein said determining the orientation angle is performed automatically based an orientation angle of one or more other parking sequence objects defined over the map.

14. The method of claim 1, wherein said determining the orientation angle comprises obtaining the orientation angle from the user.

15. The method of claim 1, wherein the parking slot detection model is trained to identify parking sequence objects based on the parking sequence object, in addition to being trained to identify parking slot objects based on the plurality of parking slot objects.

16. The method of claim 1, wherein the parking sequence object is a compact representation of the plurality of parking slot objects, whereby storage volume utilized in storing parking sequence objects is reduced compared to storage volume utilized for storing a corresponding set of plurality of parking slot objects.

17. The method of claim 1, wherein the map is a satellite image.

18. A computerized apparatus having a hardware processor, the hardware processor being coupled to a memory, the hardware processor adapted to perform the steps of:

presenting a map to a user, the map representing an overhead view of an at least partially drivable area;

defining a parking sequence object in the map, the parking sequence object comprising a plurality of parking slot objects, wherein said defining comprises:

obtaining, from the user, a user selection in the map of a start point and of an end point, wherein the parking sequence object is between the start point and the end point; and determining an orientation angle of the parking sequence object;

determining, based on the parking sequence object, the plurality of parking slot objects, the plurality of parking slot objects are equidistant along a line defined between the start point and the end point, the plurality of parking slot objects are positioned in an identical angle with respect to the line, wherein the identical angle is defined based on the orientation angle;

presenting over the map the plurality of parking slot objects; and utilizing the plurality of parking slot objects in training a parking slot detection model, the parking slot detection model is a digital product that is configured to identify parking slots in maps.

19. A computer program product comprising a non-transitory computer readable storage medium retaining program instructions, which program instructions when read by a processor, cause the processor to perform a method comprising:

presenting a map to a user, the map representing an overhead view of an at least partially drivable area;

defining a parking sequence object in the map, the parking sequence object comprising a plurality of parking slot objects, wherein said defining comprises:

obtaining, from the user, a user selection in the map of a start point and of an end point, wherein the parking sequence object is between the start point and the end point; and determining an orientation angle of the parking sequence object;

determining, based on the parking sequence object, the plurality of parking slot objects, the plurality of parking slot objects are equidistant along a line defined between the start point and the end point, the plurality of parking slot objects are positioned in an identical angle with respect to the line, wherein the identical angle is defined based on the orientation angle;

presenting over the map the plurality of parking slot objects; and utilizing the plurality of parking slot objects in training a parking slot detection model, the parking slot detection model is a digital product that is configured to identify parking slots in maps.

* * * * *